United States Patent [19]

Firth, Jr.

[11] Patent Number: 4,921,620

[45] Date of Patent: May 1, 1990

[54] CHROME HUMATES AS DRILLING MUD ADDITIVES

[75] Inventor: William C. Firth, Jr., Robbinsville, N.J.

[73] Assignee: Union Camp Corporation, Wayne, N.J.

[21] Appl. No.: 797,511

[22] Filed: Nov. 13, 1985

Related U.S. Application Data

[62] Division of Ser. No. 699,642, Feb. 2, 1985.

[51] Int. Cl.$^5$ .............................................. C09K 7/02
[52] U.S. Cl. ........................... 252/8.513; 252/8.51; 252/8.511; 252/8.514
[58] Field of Search ................ 252/8.5 A, 8.5 C, 8.51, 252/8.511, 8.513, 8.514

[56] References Cited

U.S. PATENT DOCUMENTS

| | | | |
|---|---|---|---|
| 2,605,221 | 7/1952 | Hoeppel | 252/8.5 |
| 3,009,874 | 11/1961 | Chisholm | 252/8.5 |
| 3,168,475 | 2/1965 | Jordan et al. | 252/8.5 |
| 3,494,865 | 2/1970 | Andrews et al. | 252/8.5 |
| 3,956,142 | 5/1976 | Wilson et al. | 252/8.5 |
| 4,235,727 | 11/1980 | Firth | 252/8.5 |
| 4,311,600 | 1/1982 | Firth | 252/8.5 |

FOREIGN PATENT DOCUMENTS

1276411 6/1972 United Kingdom .

OTHER PUBLICATIONS

Chemical Abstracts, Abs. No. 88088n, vol. 76, 1972.
Chemical Abstracts, Abs. No. 85304h, vol. 67, 1967.

*Primary Examiner*—John F. Terapane
*Assistant Examiner*—Gary L. Geist
*Attorney, Agent, or Firm*—Edward J. Sites

[57] ABSTRACT

The disclosure is of the use of chrome humate derivatives to reduce the viscosity of and/or to prevent fluid loss in water-based drilling fluids. The composition is much more effective as a drilling mud thinner, and as a fluid loss control agent than the commercially available ferrochrome lignosulfonate, chrome lignite or humate compositions.

17 Claims, No Drawings

CHROME HUMATES AS DRILLING MUD ADDITIVES

This is a division of application Ser. No. 699,642, filed Feb. 8, 1985.

BACKGROUND OF THE INVENTION

1. Field of the Invention

The invention relates to methods and compositions for reducing the viscosity of and for preventing fluid loss in water-based drilling mud compositions and more particularly relates to the use of chrome humates to thin and to prevent fluid loss in water-based drilling fluids.

2. Brief Description of the Prior Art

In drilling earth bores or wells, drilling fluids are circulated past the rotary drill bit to remove cuttings, lubricate and cool the bit, and seal the bore formation. The procedure is not without certain difficulties. One difficulty is the encountering of certain formation such as gypsum, which "cuts" the drilling fluid to the point that components of the drilling fluid such as bentonite clays will flocculate. The fluid viscosity increases so that there is potential for damage to the rotary drill bit.

Another potential difficulty is encountered when the bore penetrates a heaving shale. A heaving shale absorbs water from the water-based drilling fluids, leaving the swollen bentonite clay component to close the bore around the drill string. Continued circulation of the drilling fluid is impaired and the drill string can seize.

In deep bores, relatively high drilling temperatures, eg. about 300° F. and higher are encountered. In that environment, water-based drilling fluids thicken and can gel. This of course impedes pumping of the fluid and increases pumping pressures required to circulate the drilling fluids. In some cases, circulation may become impossible. This high temperature instability of the water-based drilling fluid or mud may even be aggravated in the presence of fluid contaminants such as gypsum, salt, cement and like contaminants.

Heretofore, a wide variety of drilling fluid additives have been proposed to stabilize and/or reduce the viscosity of water-based drilling muds. For some examples, see U.S. Pat. Nos. 3,009,874, 3,956,142, 4,235,727 and 4,311,600.

We have discovered that chromium salts or complexes of humate of the invention are very effective as viscosity reducing additives in water-based drilling fluids. In comparison studies with humates alone, chrome lignites and ferrochrome lignosulfonates, chrome humates of the invention were superior with respect to a combination of good thinning properties with low shear strength and good fluid loss control. This favorable balance of properties along with ease of preparation of the chrome humates makes the present invention a commercially important contribution to the improved performance of drilling fluids.

SUMMARY OF THE INVENTION

The invention comprises a viscosity reducing and/or fluid loss additive useful as an ingredient in a water-based drilling fluid composition which comprises; the product obtained upon reaction or complexation of a humate which has been obtained from association with a titanium mineral deposit, and an inorganic chromium compound.

The invention also comprises a method of reducing the viscosity of a water-based drilling mud, which comprises:

dispersing a viscosity reducing proportion of a chrome humate in the water based drilling mud.

The invention also comprises, in a water-based drilling fluid, the improvement which comprises the presence of a viscosity reducing proportion of a chrome humate of the invention.

The terms "drilling fluid" and "drilling muds" or simply "muds" as used herein refer to well known aqueous suspensions of solids, employed to facilitate the rotary drilling of bores or wells in the earth.

The term "humate" as used throughout the specification and claims refers to the products of natural flocculation or precipitation in sand deposits, of humic substances that were derived from natural leaching of decaying plant and animal material (humus). The preferred humate employed in the method and compositions of the invention are generally found in association with titanium mineral deposits and contain humic substances which may be active ingredients in the reduction of the viscosity of drilling muds.

The term "humic acid" has been widely applied to acid solids obtained from plant decompositions. More recently, humic acids have been regarded as the intermediate product or products which result in the conversion of lignin and other plant materials to hard coal. It is believed that in the decomposition of vegetable matter, that the portion of the cell wall material consisting largely of lignin is converted into humus. In time, the humus may be converted progressively to peat, brown coal, bituminuous coal and finally into anthracite. More usually, "humic substance" is applied as a generic term for the organic acids derived from humus or the top layer of the soil, containing organic decomposition products of vegetation and animal organisms in admixture with inorganic compounds, sands, minerals, metal hydroxide bases etc. The chemical structure of the humic acids has not been established, but they are believed to be large condensed ring, polymer-like molecules containing carboxylic and phenolic groups. Depending on their solubilities, humic substances are usually classified as humic acid, fulvic acid, hymatomelanic acid or humin.

DETAILED DESCRIPTION OF THE INVENTION

Water-based drilling fluids or muds are well-known aqueous suspension compositions, commony referred to as "drilling muds" or more simply as "muds". Depending on the salinity of the water phase, they may be further described as "fresh water muds" or "salt water muds". The suspended solids portions of the muds are, aside from added clays and barite, fundamentally made up of shale, anhydrite, gypsum, dolomite, limestone, and sand. Salts may also be present. Hydrophilic chemicals, both solid and liquid may be added to adjust and control viscosity, gelation, lubrication, corrosion, contamination, water loss, etc. Portions of oils such as petroleum distillates may be added to form emulsions. Desirably, to promote pumpability and flow characteristics, the viscosity of the mud is held to a minimum, without obviating the gel strength of the mud. Viscosity reduction or "thinning" can occur by reducing the apparent viscosity, the yield point, the rate and degree of gelation or all three of these factors. In the present invention, viscosity is reduced by the addition of chrome humate compounds, with consequent advantages in high temperature stability of the drilling mud.

The humate employed to prepare the additives of the invention, may be separated from the titanium mineral sand deposits by first breaking up the deposit formation of hard pan into a ground ore of a convenient size for handling. Much of the humate in the ground ore can be washed off with water to effect the desired separation. Additional humate can be obtained by washing the concentrated ore with aqueous sodium hydroxide. The aqueous mixture containing the free humates may then be treated with, for example, a strong mineral acid such as sulfuric acid or alum to regain the natural pH of the humate and facilitate settling out of the suspended humate. The separated humate may then be dried in the sunlight or by artificial means. The separated humate is unique, compositionally, and differs significantly from leonardite in compositional make-up. For comparative purposes, the following Tables 1-3 show the elemental composition, functional group content and metal content of a humate composition separated from such a rutile and/or ileminite sand deposit, in comparison to four commercially available leonardites. The rutile/ilmenite deposit source of the humate was the one located at Green Cove Springs, Fla.

Other titanium mineral deposits from which associated humate may be separated and used in the method of the invention are found extensively in the United States in such areas as the Adirondack mountains of New York State, California, Wyoming, Minnesota and Rhode Island. A principal deposit is located at Trail Ridge, Fla. The humate is separated from deposits in a manner similar to that previously described. For comparative purposes, the following Table 4 shows the elemental composition and metal content of a representative humate composition separated from such a deposit at Trail Ridge, Fla.

TABLE 1
COMPOSITION

| | Elemental Composition (Dry Basis) (%) | | | | "As Is" Moisture | Ash Content, Wt. % | |
|---|---|---|---|---|---|---|---|
| | C | H | O | S | (%) | (As is) | (Dry Basis) |
| Rutile and/or Ilmenite Sand Humate | 38.01 | 2.38 | 25.29 | 0.58 | 3.90 | 32.85 | 34.18 |
| Commercial A Leonardite | 50.61 | 2.80 | 19.83 | 1.15 | 15.50 | 16.87 | 19.96 |
| Commercial B Leonardite | 55.42 | 2.82 | 23.15 | 1.34 | 14.81 | 15.86 | 18.61 |
| Commercial C Leonardite | 54.17 | 2.84 | 21.86 | 1.60 | 13.56 | 17.00 | 19.67 |
| Commercial D Leonardite | 52.81 | 2.94 | 23.43 | 1.47 | 13.19 | 19.06 | 21.96 |

TABLE 2
FUNCTIONAL GROUP CONTENT* AND C:H AND C:O RATIOS

| | Functional Group Contents (Dry Basis) meq/g | | Ratios, Wt./Wt. (Dry Basis) | |
|---|---|---|---|---|
| | Total Acidity | Carboxylic Acid | C:H | C:O |
| Rutile and/or Ilmenite Sand Humate | 6.1 | 2.2 | 16.0:1 | 1.5:1 |
| Commercial A Leonardite | 5.3 | 1.8 | 18.1:1 | 2.6:1 |
| Commercial B Leonardite | 6.0 | 1.8 | 19.6:1 | 2.4:1 |
| Commercial C Leonardite | 5.2 | 1.5 | 19.1:1 | 2.5:1 |
| Commercial D Leonardite | 5.1 | 1.5 | 18.0:1 | 2.2:1 |

*Methods for the functional group analysis may be found in M. Schnitzer and S. U. Kanh, "Humic Substances in the Environment," Marcel Dekker, Inc., New York, New York, 1972, pp. 39–41. The barium hydroxide method for total acidity and calcium acetate method for carboxylic acid groups described in the citation were used.

TABLE 3
METAL CONTENT

| | Metal Contents (Dry Basis) (%) | | | |
|---|---|---|---|---|
| | Al | Ti | Fe | Ca |
| Rutile and/or Ilmenite Sand Humate | 5.6 | 0.85 | 0.9 | 0.06 |
| Commercial A Leonardite | 0.8 | 0.06 | 1.1 | 2.4 |
| Commercial B Leonardite | 0.9 | 0.04 | 1.6 | 2.6 |
| Commercial C Leonardite | 0.8 | 0.05 | 1.6 | 2.4 |
| Commercial D Leonardite | 0.9 | 0.06 | 1.8 | 2.7 |

TABLE 4

| Element | Composition (%) (Dry Basis) |
|---|---|
| C | 45.21 |
| H | 3.25 |
| O | 23.75 |
| S | 0.30 |
| ash | 23.99 |
| Ti | 0.61 |
| Zr | 0.014 |
| Al | 5.34 |
| Fe | 0.46 |
| Ca | 0.007 |
| C/O ratio | 1.9:1.0 |
| C/H ratio | 13.9:1.0 |

It will be appreciated that the above analysis is for specific materials and the compositional make-up may vary somewhat for different materials within the same ore body. In general the preferred humate compositions employed in the method of the invention have compositional make-ups which provide a carbon to hydrogen ratio (weight to weight) of from 9.5–17.5:1.0; a carbon to oxygen ratio of 1.0–2.3:1.0: an aluminum content of 2.8 to 8.4 percent by weight, a titanium content of 0.5 to 3.5 percent by weight and a calcium content of less than 0.5 percent by weight.

It will be appreciated from the above comparison that the humate associated with titanium mineral deposits bears some resemblance in compositional make-up to leonardite. However, it contains substantially larger proportions of some metals, particularly aluminum and titanium, as well as lower C/H and C/O ratios. There is also a lower calcium content. Although the inventor does not wish to be bound by any theory of operation, it is believed that these compositional differences over leonardite account for the functional advantages associated with the compositions of the present invention, in comparison to leonardite derivatives as a drilling mud additives. The relatively high content of aluminum and titanium suggest that the chemical make-up of the humate employed in the invention may include organotitanium and organoaluminum compounds which exert some beneficial effect when present in muds.

In addition, the relatively low C/H and C/O ratios of humate compared to the leonardite indicate the presence of relatively more highly oxygenated compounds in humate.

The method of the invention is carried out by providing chrome humate derivatives by reacting or complexing humate with an inorganic chromium compound and dispersing a viscosity reducing proportion of the chrome derivative in a water-based drilling fluid.

Table 5 below shows representative chromium compounds which may be used as reactants with humate to obtain chrome humates although this list is not to be construed as limiting.

TABLE 5
REPRESENTATIVE CHROMIUM COMPOUNDS
AVAILABLE FOR REACTION WITH HUMATE

| NAME | STRUCTURE | % CHROMIUM |
|---|---|---|
| sodium dichromate dihydrate | $Na_2Cr_2O_7.2H_2O$ | 34.9 |
| sodium chromate tetrahydrate | $Na_2CrO_4.4H_2O$ | 22.22 |
| chromic sulfate, basic | $Cr(OH)SO_4.(Na_2SO_4,XH_2O)$ | 17.10 |
| chromic chloride, basic | $Cr(OH)Cl_2.2H_2O$ | 28.0 |
| chromic chloride | $CrCl_3.XH_2O$ | 12.10 |
| chromium potassium sulfate | $K_2SO_4.Cr_2(SO_4)_3.XH_2O$ | 15.40 |

Dispersion of the chrome humate in a drilling fluid may be carried out employing conventional mixing and agitating equipment, employed conventionally for dispersing like additives in drilling mud compositions.

It will be appreciated by those skilled in the art that specific proportions employed may depend upon conditions encountered in the drilling of the well and may be varied. For example, as the drilling of the bore or well progresses and becomes deeper, temperatures in the well will increase, requiring different proportions of additive. Further, if the drilling fluid becomes contaminated during drilling of the well, more additive may be required to counteract the effects of the contamination. Clearly, a specific proportion of additive may be varied depending upon the drilling conditions. It can be stated however that normally the proportion will be within the range of from about 0.25 to 25, preferably about 1 to 15, and most preferably about 1 to 10 lbs. per barrel (ppb) of drilling mud. The term "barrel" as used herein refers to a barrel of 42 standard U.S. gallons.

The method and compositions of this invention offer a number of advantages over the prior art. Under the test conditions used, and at levels of 2.5 and 5.0 ppb, all of the four representative chrome humates synthesized and described hereinafter showed thinning performance as measured by yield point which compared favorably to that of both a commercial ferrochrome lignosulfonate and unmodified humate, and which was considerably better, even when the charge was half that of a commercially available chrome lignite. At the 5 ppb level, moreover, all four representative chrome humate derivatives showed lower shear strengths than both unmodified humate and the chrome lignite. In addition, at this same charge level, three of the four chrome humates also showed substantially better high temperature, high pressure (HTHP) fluid loss control than did unmodified humate and the commercial ferrochrome lignosulfonate. In fact, these same chrome humates gave high temperature, high pressure (HTHP) filtrates which compared very favorably to that of the commercial chrome lignite.

Overall, the most favorable balance of properties was obtained with one particular derivative, chrome humate (II) (described hereinafter). This derivative has the additional advantage of containing only about one half of the chromium content of chrome lignite and can be prepared with the most inexpensive chromium reagent (dichromate) and by a very simple process. Thus, the chrome humate derivatives offer the desirable properties of thinning with low shear strength and good fluid loss control, and it is this favorable balance of properties (when compared to unmodified humates, chrome lignites and ferrochrome lignosulfonate) that makes them superior drilling mud additives.

The following examples describe the manner and process of making and using the invention and set forth the best mode contemplated by the inventor of carrying out the invention but are not to be construed as limiting. The physical test data presented were obtained using procedures specified by API (American Petroleum Institute) RP 13B, "Standard Procedure for Testing Drilling Fluids", and Appendix A, API RP 29, 4th EDN, "Suggested Procedures for Laboratory Evaluation of Drilling and Materials".

A Fann viscometer (Model No. 35A) was used to determine the apparent viscosity, plastic viscosity, yield point, 10-second gel strength and 10-minute gel strengths. Commercially available drilling mud testing equipment was used for the A.P.I. filtrate and high temperature/high pressure filtrate determinations. The amounts of additives in the examples are on a moisture free basis.

GENERAL PROCEDURE FOR PREPARATION OF CHROME HUMATES

The general procedure for the preparation of chrome humates is based on the procedure described in U.S. Pat. No. 3,009,874. Some modifications may be made depending on reagents and the desired derivative to be synthesized.

PREPARATION I

Humate suspension (359 g., 76.0 g dry humate), taken from a settling pond, and with the composition on a dry basis as shown in Table 1, supra., is diluted with water to 18% solids concentration and the pH is adjusted as shown in Table 6. The mixture is stirred and heated to 70° C. The chromium reagent, as an aqueous solution, is then slowly added over one-half hour. The temperature is raised to 75° and maintained at about 75° for one hour. The remaining amount of potassium hydroxide specified in Table 6 is added (as a 50% solution by weight). The total amount of water added is adjusted to give a final humate solids concentration of 16% by weight. The reaction mixture is heated for a final hour at 75°–80° C. At the end of the reaction, the product is cooled in a water bath and then freeze-dried.

Following this procedure four chrome humate derivatives are prepared using the two different chromium compounds and four conditions listed in Table 6 below.

If more mud is needed additional batches are prepared using the above formulation and then combined.

After aging, the base mud is rehomogenized by shaking before portions are taken for treatment with additives.

EXAMPLE 1

The four chrome humate derivatives of Preparation 1 (I, II, III, IV) were compared with humate, chrome lignite (Cr-lig) and ferrochrome lignosulfonate (Cr-lignosulfonate) for properties of thinning and fluid loss control. The base mud with no additive served as a control. The additives tested and the levels used are shown in Table 7. The procedure is described below.

A portion (350 ml) of the base mud of Preparation 2 is added to each of eight appropriate mixing vessels.

Each example base mud is stirred with a standard Hamilton Beach mixer which is connected to a continuously variable motor speed controller. The stirring speed is measured with a phototachometer and adjusted to 13,000 rpm under load during the formulation procedure. The base mud is stirred for 2.5 minutes, and the additive added over the next 2.5 minutes. Stirring is continued for an additional 2.5 minutes. Then a calculated amount of distilled water is added so that the amount of water added to each sample, including that added in the additive and with the sodium hydroxide solution, is a constant 11.1 ml per 350 ml of base mud for each sample. Finally the specified amount of sodium hydroxide (Table 7) is added as a solution (0.25 g/ml). After all components are added, stirring is continued so that each sample is stirred for a total of 15 minutes at 13,000 rpm.

TABLE 6

| | | Drilling Mud Additives in the Chrome Humate Series | | | | |
|---|---|---|---|---|---|---|
| | | Chromium (o.d. basis) | | pH | | Total KOH, |
| Additives | Description | Applied, % on humate | Found, % in product[a] | Initial[b] | Final | % on Humate |
| Chrome Humate (I) | Dichromate-oxidized | 1.86 | 1.25 | 5.4 | 11.3 | 28.0 |
| Chrome Humate (II) | Dichromate-oxidized | 0.93 | 0.80 | 5.1 | 9.95 | 22.9 |
| Chrome Humate (III) | Complex with basic chrome (III) sulfate | 1.86 | 1.61 | 5.1 | 10.6 | 28.0 |
| Chrome Humate (IV) | Dichromate-oxidized at acidic pH | 1.86 | 1.37 | 2.5 | 10.2 | 27.7 |
| Humate (Control) | Freeze-dried from settling pond suspension | — | 0.1 | — | — | — |
| Chrome Lignite | Commercial additive | — | 1.54 | — | — | — |
| Ferrochrome Lignosulfonate | Commercial additive | — | — | — | — | — |

[a]Based on emission spectographic analysis.
[b]As adjusted either potassium hydroxide solution or sulfuric acid solution.

PREPARATION 2

Preparation of Base Mud

The mud formulation is:
4200 ml distilled water
10.44 g sodium chloride
21.00 g calcium carbonate
120.00 g Dixie Bond clay
180.00 g Wyoming Bentonite
252.00 g Imco-Klay.

The salt and calcium carbonate are added to the water and stirred with a Lightnin Model 10 stirrer at about 1700 rpm for five minutes. The clays are sprinkled onto the stirred mixture in the order given above, over 15 minutes. The entire batch is stirred for one hour more. The mud is aged for at least 24 hours before use.

The samples are then transferred to high temperature/high pressure aging cells, pressurized to 150 psi with nitrogen and heated under static conditions in an oven for 16 hours at 350° F. At the end of this period the mixtures are cooled to room temperature, restirred for five minutes at 13,000 rpm, quickly adjusted to 75° F. and viscosities and gel strengths determined. Portions of the mixtures for the A.P.I. filtration test (at room temperature) and HTHP (high temperature/high pressure) filtration test (300° F., 600 psi on cell, 100 psi back pressure on receiver) are restirred for one minute and ten minutes, respectively, just before the tests are run.

The test results are shown in the drawings (FIGS. 1 and 2) and Tables 8, 9 and 10, below.

Since low values of yield point, shear strength and filtrate loss are desirable in a drilling mud, it can be readily seen that the chromium humate derivatives have the best overall balance of these properties in heat aged muds when compared to either unmodified humate, or to the two commercial chrome additives (chrome lignite and ferrochrome lignosulfonate).

TABLE 7

| Drilling Mud Formulations | | |
|---|---|---|
| Additive | | |
| Type | PPB | NaOH (dry basis) PPB |
| None | — | 0.9 |
| Chrome Humate (I) | 2.5 | 0.9 |
| | 5.0 | 1.0 |
| Chrome Humate (II) | 2.5 | 0.9 |
| | 5.0 | 1.0 |
| Chrome Humate (III) | 2.5 | 0.9 |
| | 5.0 | 0.9 |
| Chrome Humate (IV) | 2.5 | 0.9 |
| | 5.0 | 0.9 |
| Cr-Lig | 2.5 | 1.0 |
| | 5.0 | 1.1 |
| Cr-Lignosulfonate | 2.5 | 1.4 |
| | 5.0 | 1.8 |
| Humate | 2.5 | 1.4 |
| | 5.0 | 1.9 |

TABLE 8

EFFECTS OF ADDITIVES ON DRILLING MUD PROPERTIES AFTER STATIC AGING AT 350° F.:

| Additive | Level, ppb | Apparent Visc, cps | Plastic Visc, cps | Yield Point$^a$ | 10-Sec. Gel Str.$^a$ | 10-Min. Gel Str.$^a$ | Shear Str.$^a$ | Filtrate Test (ml) API | HTHP |
|---|---|---|---|---|---|---|---|---|---|
| Humate | 2.5 | 15.8 | 14.0 | 3.5 | 1.5 | 3.0 | 670 | 12.8 | Blowout |
| Humate | 5.0 | 19.5 | 14.0 | 11.0 | 8 | 43 | 1566 | 11.0 | 41.8 |
| Ferrochrome Lignosulfonate | 5.0 | 22.0 | 13.2 | 17.5 | 2 | 59 | 388 | 14.0 | 46.3 |
| Chrome Lignite | 5.0 | 60.0 | 42.0 | 36.0 | 6 | 81 | 1754 | 10.2 | 34.4 |

$^a$lb/100 Ft$^2$

TABLE 9

EFFECTS OF ADDITIVES ON DRILLING MUD PROPERTIES AFTER STATIC AGING AT 350° F.:

| Additive$^a$ | Apparent Visc$^b$ | Plastic Visc$^b$ | Yield Point$^c$ | 10-Sec. Gel Str.$^c$ | 10-Min. Gel Str.$^c$ | Shear Str.$^c$ | Filtrate Test (ml) API | HTHP |
|---|---|---|---|---|---|---|---|---|
| Humate | 19.5 | 14.0 | 11.0 | 8 | 43 | 1566 | 11.0 | 41.8 |
| Chrome Humate (I) | 22.5 | 19.0 | 7.0 | 1 | 25 | 702 | 11.7 | 57.0 |
| Chrome Humate (II) | 29.8 | 22.5 | 14.5 | 2 | 44 | 468 | 10.2 | 36.2 |
| Chrome Humate (III) | 29.8 | 22.0 | 15.5 | 3 | 53 | 468 | 11.0 | 37.8 |
| Chrome Humate (IV) | 25.5 | 17.0 | 17.0 | 3 | 50 | 351 | 10.7 | 38.3 |

$^a$At 5 ppb
$^b$cps
$^c$lb/100 ft$^2$

TABLE 10

EFFECTS OF ADDITIVES ON DRILLING MUD PROPERTIES AFTER STATIC AGING AT 350° F.:

| Additive$^a$ | Apparent Visc$^b$ | Plastic Visc$^b$ | Yield Point$^c$ | 10-Sec. Gel Str.$^c$ | 10-Min. Gel Str.$^c$ | Shear Str.$^c$ | Filtrate Test (ml) API | HTHP |
|---|---|---|---|---|---|---|---|---|
| Chrome Humate (II) | 29.8 | 22.5 | 14.5 | 2 | 44 | 468 | 10.2 | 36.2 |
| Chrome Lignosulfonate | 22.0 | 13.2 | 17.5 | 2 | 59 | 388 | 14.0 | 46.3 |
| Chrome Lignite | 60.0 | 42.0 | 36.0 | 6 | 81 | 1754 | 10.2 | 34.4 |
| Humate | 19.5 | 14.0 | 11.0 | 8 | 43 | 1566 | 11.0 | 41.8 |

$^a$At 5 ppb
$^b$cps
$^c$lb/100 ft$^2$

What is claimed is:

1. In a water-based drilling fluid which comprises an aqueous suspension of solids, the improvement which comprises;
the presence of a viscosity and/or fluid loss reducing proportion of a chrome humate dispersed in the drilling fluid, said chrome humate being one obtained upon reaction or complexation of a humate which has been obtained from association with a titanium mineral deposit, and an inorganic chromium compound;
said humate having a compositional make-up of a carbon to hydrogen with a ratio (weight to weight) of 9.5–17.5:1.0; a carbon to oxygen (weight to weight) ratio of 1.0–2.3:1.0; an aluminum content of 2.8–8.4 percent by weight; a titanium content of 0.5–3.5 percent by weight and a calcium content of less than 0.5 percent by weight.

2. The fluid of claim 1 wherein the chrome humate is humate oxidized with sodium dichromate.

3. The fluid of claim 1 wherein the chrome humate is humate oxidized with sodium chromate.

4. The fluid of claim 1 wherein the chrome humate is humate oxidized with sodium dichromate at acidic pH.

5. The fluid of claim 1 wherein the chrome humate is humate complexed with chromium sulfate.

6. The fluid of claim 1 wherein the chrome humate is humate complexed with chromium chloride.

7. The fluid of claim 1 wherein the chrome humate has a chromium content effective to enhance thinning and reduce fluid loss.

8. A method of reducing the viscosity and/or fluid loss of a water-based drilling mud which comprises an aqueous suspension of solids, which comprises:

dispersing a viscosity and/or fluid loss reducing proportion of a chrome humate in the water-based drilling mud;

said chrome humate being one obtained upon reaction or complexation of a humate which has been obtained from association with a titanium mineral deposit, and an inorganic chromium compound;

said humate having a compositional make-up of a carbon to hydrogen ratio (weight to weight) of 9.5–17.5:1.0; a carbon to oxygen (weight to weight) ratio of 1.0–2.3:1.0; an aluminum content of 2.8–8.4 percent by weight; a titanium content of 0.5–3.5 percent by weight and a calcium content of less than 0.5 percent by weight.

9. The method of claim 8 wherein the chrome humate is humate oxidized with sodium dichromate.

10. The method of claim 8 wherein the chrome humate is humate oxidized with sodium chromate.

11. The method of claim 8 wherein the chrome humate is humate oxidized with sodium dichromate at acidic pH.

12. The method of claim 8 wherein the chrome humate is humate complexed with chromium sulfate.

13. The method of claim 8 wherein the chrome humate is humate complexed with chromium chloride.

14. The method of claim 8 wherein the chrome humate has a chromium content effective to enhance thinning and reduce fluid loss.

15. The method of claim 8 wherein the chrome humate is dispersed in the water-based drilling mud in a proportion of 0.25–25 pounds per barrel.

16. The method of claim 15 wherein the proportion is 1–15 pounds per barrel.

17. The method of claim 15 wherein the proportion is 1–10 pounds per barrel.

* * * * *